United States Patent [19]
MacKenzie et al.

[11] Patent Number: 5,420,740
[45] Date of Patent: May 30, 1995

[54] GROUND FAULT CIRCUIT INTERRUPTER WITH IMMUNITY TO WIDE BAND NOISE

[75] Inventors: Raymond W. MacKenzie, Baldwin Borough; Joseph C. Engel, Monroeville Boro, both of Pa.

[73] Assignee: Eaton Corporation, Cleveland, Ohio

[21] Appl. No.: 121,707

[22] Filed: Sep. 15, 1993

[51] Int. Cl.⁶ .............................. H02H 3/16
[52] U.S. Cl. ........................... 361/45; 361/43; 361/113
[58] Field of Search ................. 361/42, 43, 44, 45, 361/46, 47, 48, 49, 50, 113

[56] References Cited

U.S. PATENT DOCUMENTS

| | | | |
|---|---|---|---|
| 3,852,642 | 12/1974 | Engel et al. | 317/18 |
| 3,858,130 | 12/1974 | Misencik | 335/18 |
| 3,930,187 | 12/1975 | Misencik | 317/18 |
| 4,081,852 | 3/1978 | Coley et al. | 361/45 |
| 4,208,688 | 6/1980 | Misencik et al. | 361/46 |
| 4,542,432 | 9/1985 | Nichols, III et al. | 361/44 |
| 4,574,324 | 3/1986 | Packard | 361/46 |
| 4,897,756 | 1/1990 | Zylstra | 361/44 |
| 4,949,214 | 8/1990 | Spencer | 361/95 |
| 5,224,006 | 6/1993 | MacKenzie et al. | 361/45 |

OTHER PUBLICATIONS

Raython Company Semiconductor Division; RV4145 Low Power Ground Fault Interrupter; Preliminary Product Specifications Linear Integrated Circuits RV4145 (pp. 1–7).

*Primary Examiner*—Todd Deboer
*Attorney, Agent, or Firm*—Martin J. Moran

[57] ABSTRACT

In a ground fault circuit interrupter in which it was found that wide band noise induced by load transients is rectified by an op-amp in the detector circuit, false trips due to the wide band noise are eliminated by only comparing the output of the amplifier with a threshold of opposite polarity to that of the rectified noise signal and by eliminating capacitive coupling between the current sensor and the op amp. This requires an op amp with a low offset, on the order of about five percent or less.

7 Claims, 3 Drawing Sheets

GROUND FAULT CIRCUIT INTERRUPTER WITH IMMUNITY TO WIDE BAND NOISE

BACKGROUND OF THE INVENTION

1. Field of the Invention

This invention relates to circuit interrupters which respond to ground faults and in particular to such circuit interrupters with immunity to false tripping caused by transients such as wide band noise induced by load related switching phenomenon.

2. Background Information

Ground fault interrupters include ground fault circuit breakers, ground fault receptacles, and even cord mounted ground fault protection devices. Ground fault interrupters may be troubled by false tripping, even though they pass all present industry standards. One cause of false tripping is disconnection of the power to inductive appliances, particularly by unplugging the appliances.

Examples of these appliances include electric shavers, high intensity lamps, and small cooling fans, such as are used for cooling electronic equipment. Unplugging these appliances generates an arc between the plug and the receptacle, resulting in the superimposition of several volts of wide band noise onto the power line. Due to the wide band nature of the noise, even a very small stray coupling capacitance will couple the noise from the power line conductor into the ground fault circuit, causing a false trip.

A typical ground fault interrupter includes an operational amplifier which amplifies the sensed ground fault signal and applies the amplified signal to a window comparator which compares it to positive and negative reference signals. If either reference value is exceeded, a trip signal is generated. A common type of ground fault detection circuit is the dormant oscillator detector. This detector includes a first sensor coil through which the line and neutral conductors of the protected circuit pass. The output of the first sensor coil is applied through a coupling capacitor to the above-described operational amplifier followed by a window comparator. A line-to-ground fault causes the amplified signal to exceed the reference value and generates a trip signal.

The dormant oscillator ground fault detector includes a second sensor coil through which only the neutral conductor passes. A neutral-to-ground fault couples the two detector coils causing the amplifier to oscillate which also results in generation of a trip signal.

It has been found that wide band noise induced by load related switching phenomena such as is caused by unplugging inductive appliances causes false tripping of the ground fault interrupter.

Commonly owned U.S. patent application Ser. No. 023,435 filed on Feb. 26, 1993 discloses a ground fault circuit interrupter of the dormant oscillator type which utilizes the output of the second sensor coil to detect sputtering arc faults. This is accomplished by bandwidth limiting the di/dt sensor signal and comparing it to appropriate thresholds such as in a window comparator. Sputtering arc fault currents are generally smaller in magnitude than line-to-ground fault currents, but are intermittent, so that detection of successive excursions above the thresholds provides an indication of a sputtering arc fault.

There is a need for a ground fault interrupter which does not generate a false trip in response to wide band noise in the protected circuit.

There is also a need for such a ground fault circuit with improved immunity to wide band noise which also responds to sputtering arc faults.

SUMMARY OF THE INVENTION

These needs and others are satisfied by the invention. We have discovered that in the typical electronic circuit used in a ground fault interrupter having an operational amplifier followed by a window comparator, any large amplitude wide band noise coupled into the circuit is rectified at the operational amplifier input, thereby causing the amplifier output to be driven in one polarity. Additionally, the input coupling capacitor becomes charged, and following the termination of the noise burst, the capacitor charge drives the operational amplifier output in the opposite direction of the noise burst effect. Either of these effects may produce a false trip.

The noise immunity of the ground interrupter can therefore be improved by the deletion of the level detector of the window comparator which detects excursions at the operational amplifier output of the polarity of the output signal produced by the noise. In addition, the input coupling capacitor is eliminated so that no opposite polarity excursion is produced following the termination of the noise burst which could trip the output of the remaining level detector. With the deletion of the coupling capacitor, a low offset operational amplifier is used.

More particularly, the invention is directed to a ground fault circuit interrupter or interrupting current in a protected ac electric system subject to wide band noise, comprising:

- separable contacts interrupting current flow in the protected electrical system when opened;
- sensing means generating an ac sensor signal representative of ac current flowing from the protected electric system to ground;
- trip signal generating means comprising amplifier means connected to the sensing means generating at an output an amplified ac sensor signal in response to the ac sensor signal and containing amplified wide band noise of a first polarity only, and comparator means connected to the output of the amplifier means and generating a ground fault trip signal only when the amplified ac signal is of a second polarity opposite the first polarity and exceeds a reference signal in magnitude; and
- trip means responsive to the ground fault trip signal to open the separable contacts.

The ground fault interrupter can be combined with a sputtering arc detector to provide more complete protection for the electrical system. In the preferred form of the invention the ground fault interrupter is of the dormant oscillator type and the sputtering arc fault detection circuit utilizes one of the detector coils from the ground fault detection circuit.

BRIEF DESCRIPTION OF THE DRAWINGS

A full understanding of the invention can be gained from the following description of the preferred embodiment when read in conjunction with the accompanying drawings in which.

DESCRIPTION OF THE PREFERRED EMBODIMENTS

The invention will be described as applied to a conventional residential circuit breaker; however, it will be appreciated by those skilled in the art that the invention has application to other types of ground fault interrupters including ground fault receptacles, and cord mounted ground fault protection devices. In particular, the invention will be described as applied to a circuit breaker of the type described in U.S. Pat. No. 4,081,852 which is herein incorporated by reference. That circuit breaker includes a thermo-magnetic overcurrent trip mechanism and a ground fault detector mounted in side-by-side compartments within a molded housing. The ground fault detector includes a trip solenoid having a plunger which extends through the wall between the two compartments in the molded housing to actuate the thermo-magnetic trip mechanism to trip the circuit breaker in response to a ground fault.

Figure 1:
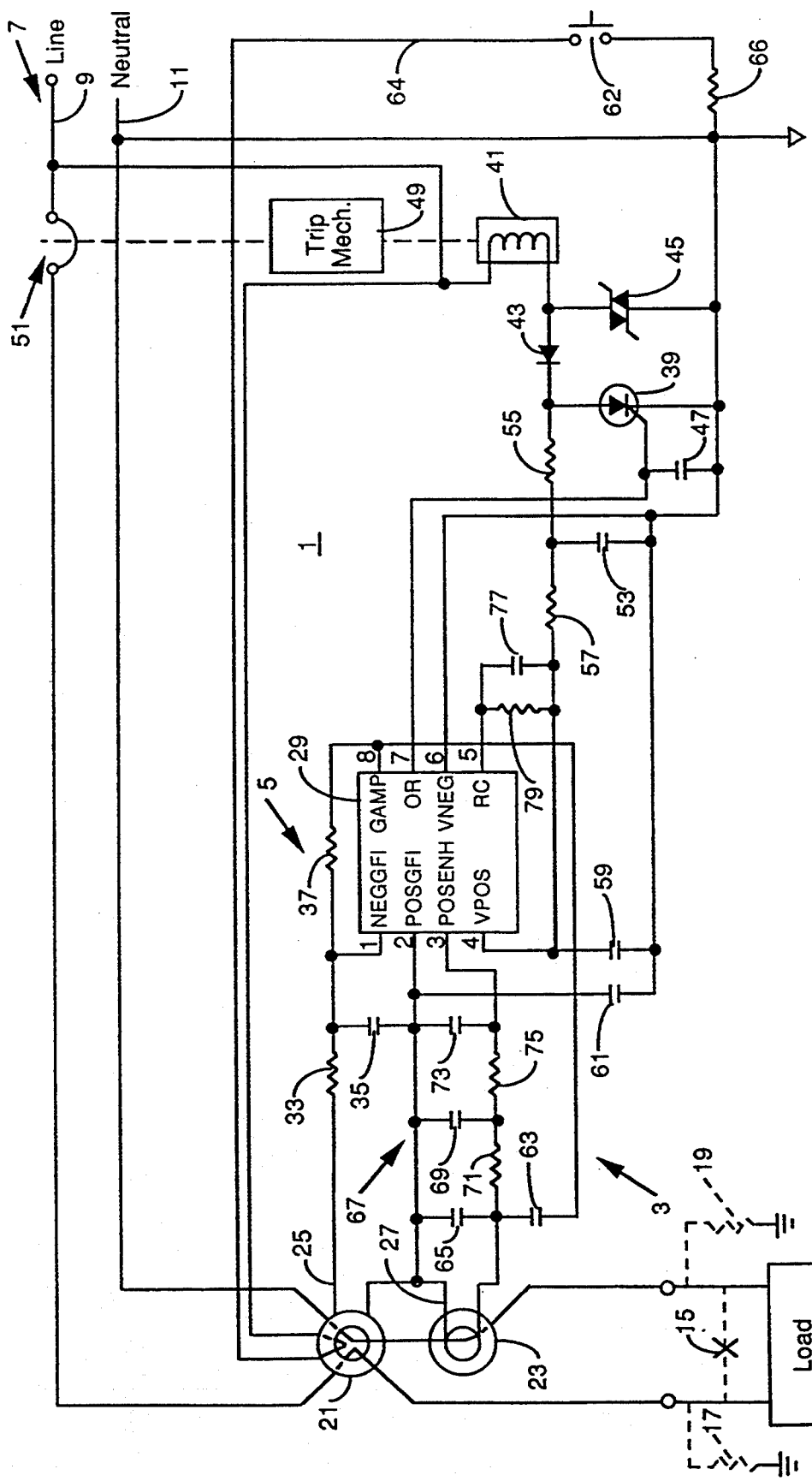
FIG. 1 is a schematic diagram of a one embodiment of the ground fault interrupter of the invention combined with, and sharing a sensing coil with, a sputtering arc fault detection circuit.

As shown in FIG. 1, the circuit breaker 1 of the invention, in its preferred embodiment, combines a sputtering arc detector 3 with a ground fault detector 5 having improved noise immunity. The circuit breaker 1 protects an electric system 7 which includes a line conductor 9 and a neutral conductor 11 which provide electric power to a load 13. In addition to protecting against typical overcurrents drawn by the load 13 and bolted line-to-neutral faults, the circuit breaker 1 of the invention protects against sputtering arc faults 15 between the line conductor 9 and a neutral conductor 11, and line-to-ground faults 17 and neutral-to-ground faults 19. The sputtering arc fault 15 results when bared sections of the line and neutral conductors come in contact due to, for instance, worn or stripped insulation.

Faults in the electrical system 7 are detected by the circuit breaker 1 by current sensors in the form of current sensing transformers 21 and 23. These current sensing transformers 21 and 23 are toroidal coils. The line conductor 9 and neutral conductor 11 are passed through the opening in the toroidal coil 21 to form the primary of that current transformer. The current transformer 23 has a single primary in the form of the neutral conductor 11 which passes through the opening of the toroidal coil. The secondary winding 25 of the current transformer 21 and the secondary winding 27 of the current transformer 23 are each connected to an integrated circuit 29.

The current transformer 21 detects line-to-ground faults. With no line-to-ground fault on the electrical system 7, the currents through the line and neutral conductors 9, 11 which form the primaries of the transformer will be equal and opposite so that no current will be induced in the secondary winding 25. If the line conductor 9 is grounded, there will be a large current through this conductor and little or no current through the neutral conductor 11 so that a sizable current will be induced in the secondary winding 25. This signal is applied to the IC 29 through the NEGGFI and POSGFI inputs through a resistor 33. A capacitor 35 across the IC inputs provides noise suppression. A feedback resistor 37 sets the gain for the op amp in the IC 29.

As will be discussed in more detail below, if the magnitude of the current in the secondary winding 25 of the current transformer 21 exceeds a threshold selected to detect a line-to-ground fault, the OR output on the IC 29 goes high to turn on an SCR 39. Turning on of the SCR 39 provides current for energization of a trip solenoid 41 with current drawn from the line and neutral conductors. This current is half wave rectified by the diode 43. The SCR 39 is protected from surges by the metal oxide varistor (MOV) 45 and from noise on the gate by capacitor 47. Energization of the trip solenoid 41 actuates the trip mechanism 49 as described in U.S. Pat. No. 4,081,852 to open contacts 51 at least in the line conductor 9.

The diode 43 also provides DC power to a shunt regulator in the IC 29. The current drawn by the IC is insufficient to actuate the trip solenoid 41. The power supply for the IC 29 includes a filter capacitor 53, and a pair of resistors 55 and 57 which determine the voltage level of the supply. This DC power is provided to the VPOS input of the IC 29. The VNEG pin is connected to the ground for the neutral conductor. A bypass capacitor 59 assures that there is no ac on the VPOS input. Similarly, another bypass capacitor 61 eliminates ac on the POSGFI input.

A test button 62 connects a test lead 64 passing through the coil 21 across the conductors 7, 11 to test the line to ground portion of the ground fault circuit. Resistor 66 limits the test current. The ground fault detector 5 is of the dormant oscillator type. The secondary winding 27 of the current transformer 23 is also connected to the output of the op amp in the IC 29 at pin GAMP through a coupling capacitor 63. Neutral-to-ground faults couple the secondary windings 25 and 27 though the current sensing transformers 21 and 23 to form a feedback loop around the IC 29 causing the op amp in the IC to oscillate. The frequency of this oscillation can be set by the selection of the value of the capacitor 63 and the capacitor 65 as well as the parameters of the current sensing transformers 21 and 23. In the exemplary circuit breaker, this frequency is about 20 KHz. When the magnitude of the oscillation exceeds selected thresholds, the SCR 39 is fired to trip the circuit breaker.

The current sensing transformer 23 is also used to sense current for detecting sputtering arc faults. The rate of change of current signal, di/dt, needed for sputtering arc fault detection, is generated by providing a core in the current sensing transformer 23 which does not saturate at the current level required to produce a trip. A suitable material for the core is powdered iron which has a low mu and a high flux saturation level. Such a core only affects the neutral ground detection by increasing the frequency of oscillation by a small amount.

The di/dt signal produced on the secondary winding 27 of the current sensing transformer 23 is bandwidth limited by passing it through a low pass filter 67. This is a two pole low pass filter with the first pole formed by the capacitor 69 and resistor 71, and the second pole formed by the capacitor 73 and resistor 75. This low pass filter 67 in the exemplary circuit breaker has a half-power point at about 2 KHz. The di/dt signal can be used to provide an indication of overcurrent, line-toneutral faults and sputtering arc faults. The parameters of the bandwidth limiting low pass filter 67 are selected to attenuate the spikes in the di/dt signal caused by a sputtering arc fault, and to regulate the relative sensitivity of the circuit to the sinusoidal currents of the overcurrent line-to-neutral faults and step functions of the sputtering arc faults. The detector 3 distinguishes sputtering arc faults from the in-rush currents caused by some appliances by counting the number of step functions detected within a predetermined time period. A capacitor 77 and resistor 79 set the selected time interval in the manner to be discussed below.

Figure 2:
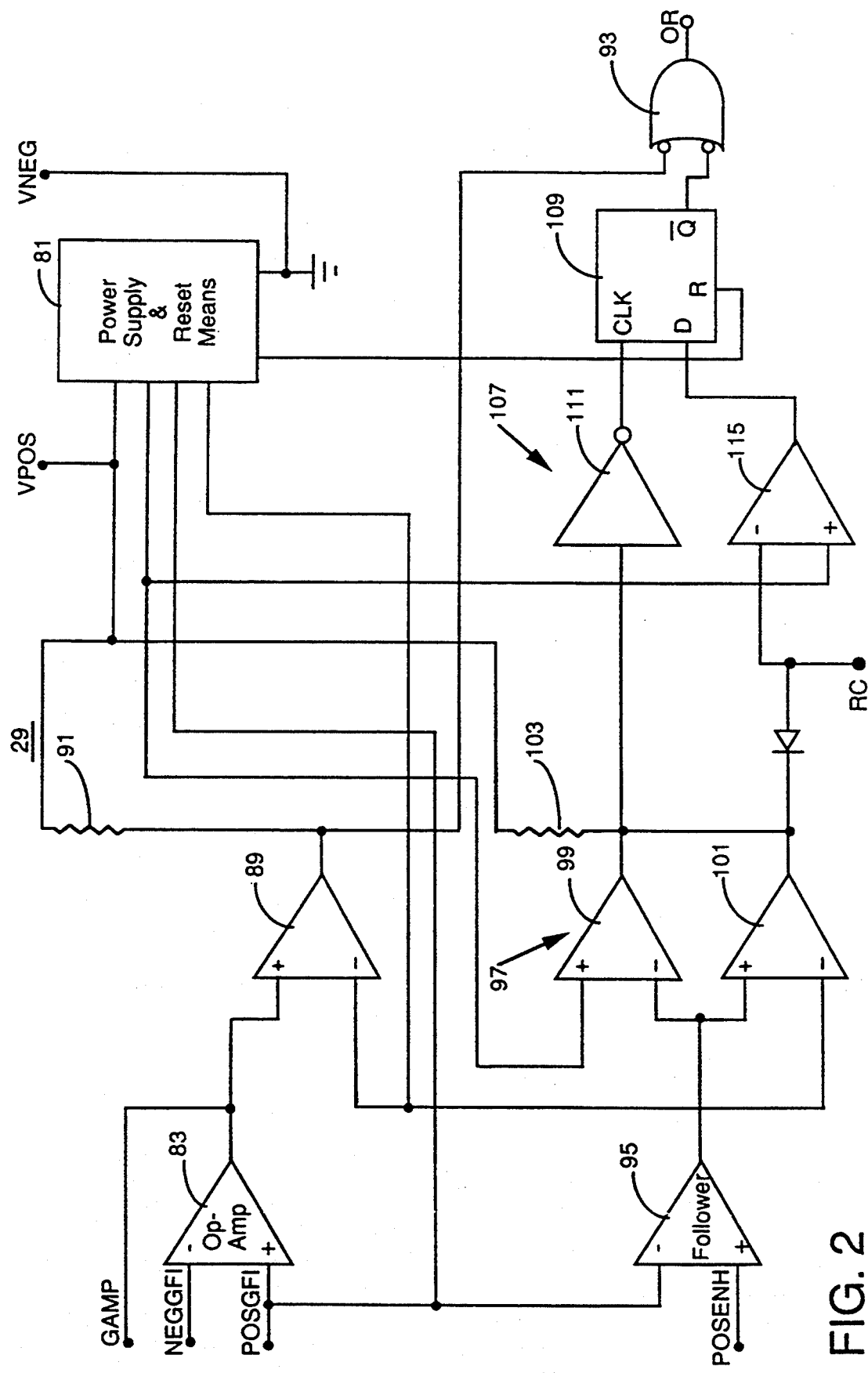
FIG. 2 is a schematic circuit diagram of an integrated circuit which forms part of the circuit of FIG. 1.

FIG. 2 is a schematic circuit diagram of the IC 29. The chip 29 has a power supply 81 which is energized by the half wave rectified supply described above through the VPOS and VNEG pins. An operational amplifier (op amp) 83 amplifies the signal on the secondary of the current sensing transformer 21 for application to a single level detector formed by comparator 89. The comparator 89 is biased by a reference voltage provided by the power supply 81 which is a negative threshold for detecting line-to-ground faults. A bias voltage, which is roughly the midpoint of the power supply voltage, is applied to the non-inverting input of the op amp 83. A pull-up resistor 91 is connected to the output of the comparator 89 and VPOS. The output of the comparator 89 is also connected to an inverting input of an OR circuit 93, the output of which is connected to the gate of the SCR 39 through the OR pin of the IC 29. Normally, the output of the comparator 89 is high so that the SCR 39 is not gated. The presence of a line-to-ground fault causes a signal generated on the secondary winding 25 of the current sensing transformer 21 to exceed the threshold applied to the comparator 89 during negative half cycles of the load current. These negative half cycles of the ground fault current cause the output of comparator 89 to go low so that the output of the OR circuit 93 goes high to gate the SCR 39 and energize the trip solenoid 41.

The ground fault detection portion of the IC 29 in the above-identified patent application utilized a window comparator instead of the single polarity comparator 89 to generate a trip signal on both positive and negative half cycles of the ground fault signal. We have found, however, that the ground fault detector having an op amp followed by a window comparator is subject to false tripping. This false tripping has been traced to wide band noise such as is induced in a protected electric circuit by the unplugging of inductive loads. Wide band noise of large enough magnitude is rectified by the op amp 83. The polarity of the rectified noise signal is dependent upon the circuitry of the op amp. The determining factors are the type of input transistor and the number of amplification stages in the op amp. If the input transistor is an n-p-n transistor the dc noise component in the output of the transistor is positive. An odd number of following amplification stages would invert this to a negative output while an even number of following stages would retain the positive polarity of the signal. A p-n-p transistor produces a rectified signal of the opposite polarity assuming the same number of following amplification stages.

Since the polarity of the rectified wide band noise signal appearing at the output of the op amp 83 can thus be predicted, the ground fault circuit of the invention utilizes the single level detecting comparator 89 which only detects signals of the opposite polarity from that of the noise which exceed the selected threshold. The polarity of the current transformer secondary winding 25 is set such that positive half cycles of the current are tested for ground faults. This is so that the trip signal will be properly phased to gate the half wave power supplied to the SCR 39 to the trip coil 41. Such an arrangement provides that a ground fault trip signal can only be generated on positive half cycles of load current. However, if the SCR 39 is supplied with half wave rectified current it can only conduct on alternate half cycles anyway. Furthermore, delay of the trip signal by up to one-half cycle is not significant in most applications.

We have also found that the half wave rectification of the ground fault sensor signal by the op amp 83 results in charging of the coupling capacitor between the secondary winding 25 of the current transformer 21 and the input to the op amp 83 in the ground fault circuit of the above-identified application. The charge on this capacitor results in generation of an output on the op amp opposite in polarity to that of the rectified noise signal when the noise is terminated. This can also result in a false tripping of the circuit interrupter. This kickback is eliminated in accordance with the invention by avoiding capacitive coupling of the sensor coil to the op amp. Thus, only the resistor 33 is included in the coupling circuit.

Elimination of the coupling capacitor results in application of the offset voltage of the op amp to the secondary winding 25 of the sensor coil 21. A low offset op amp should therefore be used. An offset of about five percent or less provides satisfactory operation. Essentially, the offset should be low enough that it does not mask the ac ground fault signal.

As previously discussed, for neutral-to-ground faults, the second current sensing transformer 23 is connected to the output of the op amp 83 through coupling capacitor 63 connected to the GAMP pin of the IC 29. Any neutral-to-ground fault completes a feedback loop between the current sensing transformer 23 connected to the output of the op amp 83 and the current sensing transformer 21 connected to the input. When the magnitude of this oscillation exceeds the threshold of the comparator 89, the SCR 39 is gated through the OR 93.

As mentioned, the current sensing transformer 23 is also used to detect sputtering arc faults. The di/dt signal generated on the secondary winding 27, which is bandwidth limited by the low pass filter 67, is applied through a follower op amp 95 to a window comparator 97 comprising the comparators 99 and 101. The comparators 99 and 101 compare the bandwidth limited di/dt signal to positive and negative thresholds set by the power supply 81. A pull-up resistor 103 connected to VPOS maintains a high logic signal at the outputs of the comparators 99 and 101 when the bandwidth limited di/dt signal is within the selected limits. When a current wave form representative of a sputtering arc fault is detected, the output of the window comparator 97 goes low. As certain appliances can generate a similar wave form when mined on, albeit typically of lower magnitude, a counter circuit 107 is provided on the output of the window comparator 97. The counter circuit 107 counts events in which the thresholds of the window comparator 97 are exceeded. In the preferred embodiment, the counting circuit 107 generates a trip signal upon the occurrence of two such events within the selected time interval.

The counter circuit 107 includes a D flip-flop 109. The flip-flop 109 is clocked by the output of the window comparator 97 through an inverter 111. The output of the window comparator 97 is also connected through a diode 113 to the inverting input of a comparator 115. This comparator 115 compares the output of the window comparator 97 with the positive threshold voltage generated by the power supply 81. Typically, this reference voltage is about three-quarters of the power supply voltage. The output of the comparator 115 is applied to the data input D of the flip-flop 109. The $\overline{Q}$ output of the flip-flop 109, which is not used in the circuit of FIG. 2, goes to the logic value of the signal at the D terminal when a clock pulse is applied to the CLK input. Thus, the Q output of the flip-flop goes to the logical opposite of the signal applied to the D input when the flip-flop is clocked. The $\overline{Q}$ is connected to an inverting input of the OR 93.

The inverting input of the comparator 115 is also connected through the RC pin of the IC 29 to the timing capacitor 77 (see FIG. 1). The other side of the capacitor 77 is connected to VPOS. Under normal circumstances, the capacitor 77 is discharged by the shunt resistor 79. Therefore, the output of the comparator 115 is low. When the output of the window comparator 97 goes low for the first time, indicating a sputtering arc fault event, the flip-flop 109 is clocked by the leading edge of the pulse. As the D input was low at the time of the clock pulse, the $\overline{Q}$ output remains high, and no gate signal is applied to the SCR 39 through the OR 93. When the output of the window comparator 97 goes low, the capacitor 77 charges rapidly through the diode 113 to approximately VPOS. As the voltage on the non-inverting input now exceeds the reference voltage, the output of the comparator 115 goes high. When the output of the window comparator 97 again goes high as the sputtering arc current reaches its peak magnitude, the capacitor 77 begins to discharge through the resistor 79. The values of these components are selected so that the voltage on the capacitor 77 remains above the reference voltage applied to the comparator 115 for the selected time interval. As mentioned, a suitable time interval is about one second. If the output of the window comparator 97 goes low before the timer has timed out, which is indicative of a sputtering arc fault, the D input of the flip-flop 109 will be high when the flip-flop is clocked, and hence the $\overline{Q}$ output will go low, causing the output of OR 93 to go high and gate the SCR 39 on to energize the trip solenoid 41.

Figure 3:
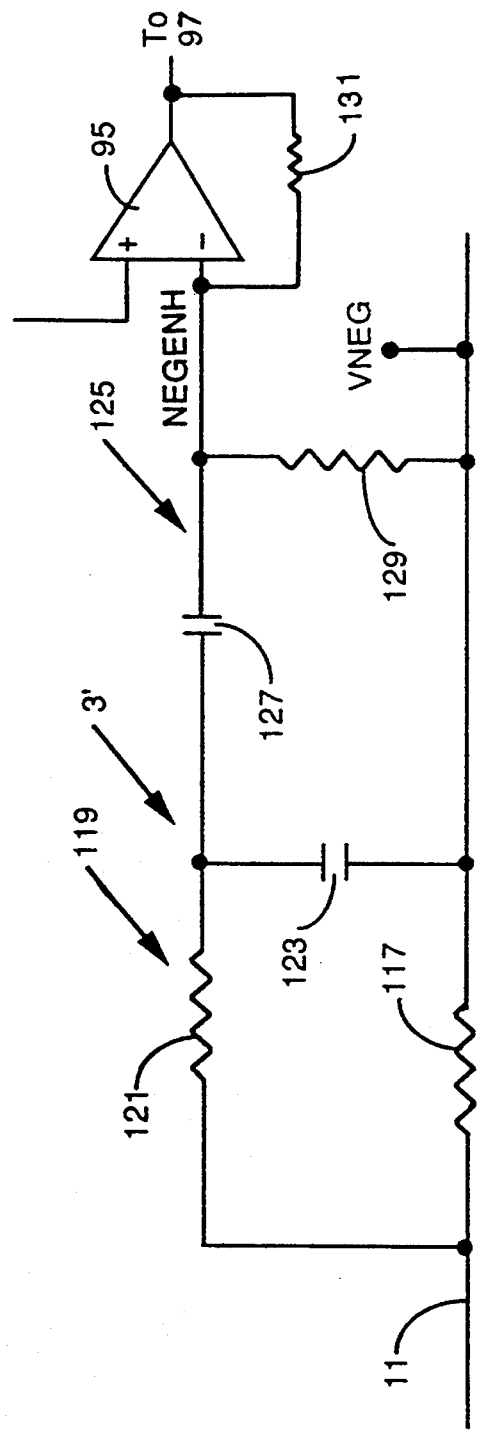
FIG. 3 is a schematic diagram illustrating a modification of a portion of the ground fault interrupter shown in FIG. 1 in which the sputtering arc fault detection circuit utilizes the resistivity of the neutral conductor in sensing sputtering arc faults rather than sharing a sensing coil with the ground fault detector.

The ground fault circuit interrupter of the invention can be used with or without the sputtering arc protection function. Also, as an alternative, the resistance of the neutral conductor 11 can be used to detect sputtering arc faults in place of the signal sensed by the current transformer 23. FIG. 3 illustrates a portion of the circuit breaker 1 with the sputtering arc fault detector 3/ so modified. As shown, the resistivity 117 of a section of the neutral conductor 11 generates a voltage which is passed through a low pass filter 119 comprising the resistor 121 and capacitor 123. The output of this low pass filter is then differentiated by a high pass filter 125 comprising a capacitor 127 and a resistor 129. This combination of a low pass filter 119 followed by a high pass filter 125 produces the same band width limited di/dt signal as the coil circuit of FIG. 1, although at a significantly lower signal level. Because of this significantly lower signal level, the output of the high pass filter 125 is applied to the inverting input identified as NEGENH of the op amp 95 so that gain, determined by the feedback resistor 131, can be applied to it to increase the signal level for application to the window comparator 97.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A ground fault circuit interrupter for interrupting current in a protected ac electric system subject to wide band noise, said circuit breaker comprising:
   separable contacts interrupting current flow in said protected electric system when opened;
   sensing means generating an ac sensor signal representative of ac current flowing from said protected electric system to ground;
   trip signal generating means comprising amplifier means connected to said sensing means generating at an output an amplified ac sensor signal in response to said ac sensor signal and containing amplified wide band noise of a first polarity only, and comparator means connected to said output of said amplifier means and generating a ground fault trip signal only when said amplified ac signal is of a second polarity opposite said first polarity and exceeds a reference signal in magnitude; and
   trip means responsive to said ground fault trip signal to open said separable contacts.

2. The ground fault circuit interrupter of claim 1 wherein said trip signal generating means includes non-capacitive input means connecting said amplifier means to said sensing means.

3. The ground fault interrupter of claim 2 wherein said amplifier means comprises operational amplifier means having an offset of no more than about five percent.

4. The ground fault interrupter of claim 1 wherein said amplifier means comprises operational amplifier means having an offset of no more than about five percent.

5. The ground fault circuit interrupter of claim 1 wherein said trip signal generating means includes sputtering arc fault detection means responsive to said sensing means generating a sputtering arc fault trip signal upon detection of a sputtering arc fault in said electrical system, and wherein said trip means is further responsive to said sputtering arc trip signal to open said separable contacts.

6. The ground fault circuit interrupter of claim 5 wherein said trip signal generating means includes non-capacitive input means connecting said amplifier means to said sensing means.

7. The ground fault circuit interrupter of claim 6 wherein said amplifier means comprises operational amplifier means having an offset of no more than about five percent.

* * * * *